US012410648B2

(12) United States Patent
Kellum

(10) Patent No.: US 12,410,648 B2
(45) Date of Patent: Sep. 9, 2025

(54) WINDOW BALANCE SHOES FOR A PIVOTABLE WINDOW

(71) Applicant: Amesbury Group, Inc., Edina, MN (US)

(72) Inventor: Wilbur J. Kellum, Garretson, SD (US)

(73) Assignee: Amesbury Group, Inc., Edina, MN (US)

( * ) Notice: Subject to any disclaimer, the term of this patent is extended or adjusted under 35 U.S.C. 154(b) by 0 days.

(21) Appl. No.: 18/795,355

(22) Filed: Aug. 6, 2024

(65) Prior Publication Data

US 2025/0027351 A1 Jan. 23, 2025

Related U.S. Application Data

(63) Continuation of application No. 17/451,792, filed on Oct. 21, 2021, now Pat. No. 12,091,895, which is a continuation of application No. 16/136,650, filed on Sep. 20, 2018, now Pat. No. 11,193,318.

(60) Provisional application No. 62/561,580, filed on Sep. 21, 2017.

(51) Int. Cl.

| | |
|---|---|
| ***E05D 15/22*** | (2006.01) |
| ***E05C 17/60*** | (2006.01) |
| ***E05D 13/00*** | (2006.01) |

(52) U.S. Cl.

CPC ............. *E05D 15/22* (2013.01); *E05D 13/04* (2013.01); *E05D 13/1207* (2013.01); *E05Y 2201/67* (2013.01); *E05Y 2900/148* (2013.01)

(58) Field of Classification Search

None

See application file for complete search history.

(56) References Cited

U.S. PATENT DOCUMENTS

| | | | |
|---|---|---|---|
| 601,283 | A | 3/1898 | Sawyer et al. |
| 698,168 | A | 4/1902 | Barnum |
| 887,968 | A | 5/1908 | Selkirk |
| 1,007,212 | A | 10/1911 | Lasersohn |

(Continued)

FOREIGN PATENT DOCUMENTS

| | | |
|---|---|---|
| CA | 2119506 | 10/1994 |
| CA | 2382933 | 4/2002 |

(Continued)

OTHER PUBLICATIONS

Balance Systems—BSI Amesbury Group, Inc. Crossbow Balance Advertisement dated Jun. 7, 1999 (3 pgs.).

(Continued)

*Primary Examiner* — Catherine A Kelly

(74) *Attorney, Agent, or Firm* — Merchant & Gould P.C.

(57) ABSTRACT

A balance shoe for a block and tackle window balance system includes an enlarged head portion housing a locking system configured to receive at least a portion of a pivot bar and releasably engage a jamb track. An elongate tail portion configured to couple at least partially within a U-shaped channel of the window balance system. A front face, the front face of the elongate tail portion being adjacent to a base wall of the U-shaped channel when the elongate tail portion is coupled therein. The front face including an elongate channel configured to allow passage of the pivot bar from the elongate tail portion towards the locking system. The balance shoe also including at least one protrusion extending from the front face of the elongate tail portion and disposed at least partially within the elongate channel.

20 Claims, 10 Drawing Sheets

(56) References Cited

U.S. PATENT DOCUMENTS 1,312,665 A 8/1919 Almquist
1,420,503 A 6/1922 Throne
1,480,453 A 1/1924 Lane
1,742,803 A 1/1930 Biron
2,069,025 A 1/1937 Anderson
2,178,533 A 10/1939 Viehweger
2,209,293 A 7/1940 Cannon et al.
2,602,958 A 7/1952 Brown
2,609,191 A 9/1952 Foster
2,609,193 A 9/1952 Foster
2,622,267 A 12/1952 Peremi
2,635,282 A 4/1953 Trammell, Sr. et al.
2,644,193 A 7/1953 Anderberg
2,684,499 A 7/1954 Lewis
2,732,594 A 1/1956 Adams et al.
2,739,344 A 3/1956 Dickinson
2,766,492 A 10/1956 Day et al.
2,807,045 A 9/1957 Chenoweth
2,817,872 A 12/1957 Foster
2,851,721 A 9/1958 Decker et al.
2,873,472 A 2/1959 Foster
2,952,884 A 9/1960 Dinsmore
3,007,194 A 11/1961 Griswold
3,105,576 A 10/1963 Jones et al.
3,150,420 A 9/1964 Brenner
3,184,784 A 5/1965 Peters
3,364,622 A 1/1968 Collard
3,434,236 A 3/1969 Weidner et al.
3,445,964 A 5/1969 Foster
3,452,480 A 7/1969 Foster
3,461,608 A 8/1969 Johnson
3,475,865 A 11/1969 Arnes
3,497,999 A 3/1970 Hendra
3,529,381 A 9/1970 Grossman
3,676,956 A 7/1972 Taylor et al.
3,732,594 A 5/1973 Mills
3,820,193 A 6/1974 Foster
3,844,066 A 10/1974 Nobes
3,869,754 A 3/1975 Foster
3,992,751 A 11/1976 Foster et al.
4,028,849 A 6/1977 Anderson
4,068,406 A 1/1978 Wood
4,079,549 A 3/1978 Wood
4,089,085 A 5/1978 Fitzgibbon
4,190,930 A 3/1980 Prosser
4,227,345 A 10/1980 Durham, Jr.
4,228,620 A 10/1980 Hutchins
4,300,316 A 11/1981 Ficurilli
4,332,054 A 6/1982 Paist et al.
4,364,199 A 12/1982 Johnson et al.
4,446,654 A 5/1984 Schoolman et al.
4,452,012 A 6/1984 Deal
4,506,478 A 3/1985 Anderson
4,510,713 A 4/1985 Anderson
4,517,766 A 5/1985 Haltof
4,555,868 A 12/1985 Mancuso
4,570,382 A 2/1986 Suess
4,571,887 A 2/1986 Haltof
4,590,708 A 5/1986 Campodonico
4,610,108 A 9/1986 Marshik
4,642,845 A 2/1987 Marshik
4,683,676 A 8/1987 Sterner, Jr.
4,689,850 A 9/1987 Flight
4,697,304 A 10/1987 Overgard
4,704,821 A 11/1987 Berndt
4,718,194 A 1/1988 FitzGibbon et al.
4,724,577 A 2/1988 Langley
4,785,581 A 11/1988 Abramson et al.
4,799,333 A 1/1989 Westfall et al.
4,837,976 A 6/1989 Westfall et al.
4,854,077 A 8/1989 Rogers et al.
4,885,871 A 12/1989 Westfall et al.
4,888,915 A 12/1989 Goldenberg
4,914,861 A 4/1990 May
4,922,657 A 5/1990 Foss
4,930,254 A 6/1990 Valentin
4,935,987 A 6/1990 Sterner, Jr.
4,941,285 A 7/1990 Westfall
4,949,425 A 8/1990 Dodson et al.
4,953,258 A 9/1990 Mennuto
4,958,462 A 9/1990 Cross
4,961,247 A 10/1990 Leitzel et al.
5,035,081 A 7/1991 Yamamoto et al.
5,036,621 A 8/1991 Iwasaki
5,069,001 A 12/1991 Makarowski
5,113,922 A 5/1992 Christensen et al.
5,119,591 A 6/1992 Sterner, Jr. et al.
5,119,592 A 6/1992 Westfall et al.
5,127,192 A 7/1992 Cross
5,140,769 A 8/1992 Hickson et al.
5,157,808 A 10/1992 Sterner, Jr.
5,189,838 A 3/1993 Westfall
5,210,976 A 5/1993 Cripps
5,232,208 A 8/1993 Braid et al.
5,251,401 A 10/1993 Prete et al.
5,301,467 A 4/1994 Schmidt et al.
5,353,548 A 10/1994 Westfall
5,365,638 A 11/1994 Braid et al.
5,371,971 A 12/1994 Prete
5,377,384 A 1/1995 Riegelman
5,383,303 A 1/1995 Nakanishi et al.
D355,262 S 2/1995 Chaney et al.
5,440,837 A 8/1995 Piltinsgrud
5,445,364 A 8/1995 Tibbals, Jr.
5,448,858 A 9/1995 Briggs et al.
5,452,495 A 9/1995 Briggs
5,463,793 A 11/1995 Westfall
5,463,795 A 11/1995 Carlson et al.
5,530,991 A 7/1996 deNormand et al.
5,544,450 A 8/1996 Schmidt et al.
5,553,903 A 9/1996 Prete et al.
5,566,507 A 10/1996 Schmidt et al.
5,572,828 A 11/1996 Westfall
5,615,452 A 4/1997 Habbersett
5,632,117 A 5/1997 Prete et al.
5,632,118 A 5/1997 Stark
5,661,927 A 9/1997 Polowinczak et al.
5,669,180 A 9/1997 Maier
5,697,188 A 12/1997 Fullick et al.
5,699,636 A 12/1997 Stark
5,704,165 A 1/1998 Slocomb et al.
5,737,877 A 4/1998 Meunier et al.
5,802,767 A 9/1998 Slocomb et al.
5,806,243 A 9/1998 Prete et al.
5,806,900 A 9/1998 Bratcher et al.
5,829,196 A 11/1998 Maier
5,852,854 A 12/1998 Pierrot et al.
5,855,092 A 1/1999 Raap et al.
5,873,199 A 2/1999 Meunier et al.
5,924,243 A 7/1999 Polowinczak et al.
5,927,013 A 7/1999 Slocomb et al.
5,943,822 A 8/1999 Slocomb et al.
5,996,283 A 12/1999 Maier
6,032,417 A 3/2000 Jakus et al.
6,041,475 A 3/2000 Nidelkoff
6,041,476 A 3/2000 deNormand
6,041,550 A 3/2000 Tix
6,058,653 A 5/2000 Slocomb et al.
6,119,398 A 9/2000 Yates, Jr.
D434,637 S 12/2000 Habeck et al.
6,155,615 A 12/2000 Schultz
6,161,335 A 12/2000 Beard et al.
6,161,657 A 12/2000 Zhuang
6,178,696 B1 1/2001 Liang
6,226,923 B1 5/2001 Hicks et al.
6,305,126 B1 10/2001 Hendrickson et al.
6,332,288 B1 12/2001 Guillemet et al.
6,378,169 B1 4/2002 Batten et al.
6,393,661 B1 5/2002 Braid et al.
D462,258 S 9/2002 Meunier
D464,256 S 10/2002 Meunier
6,467,128 B1 10/2002 Damani
6,470,530 B1 10/2002 Trunkle
D467,490 S 12/2002 Uken et al.

(56) References Cited

U.S. PATENT DOCUMENTS

| | | | |
|---|---|---|---|
| 6,553,620 | B2 | 4/2003 | Guillemet et al. |
| 6,584,644 | B2 | 7/2003 | Braid et al. |
| 6,606,761 | B2 | 8/2003 | Braid et al. |
| 6,622,342 | B1 | 9/2003 | Annes et al. |
| 6,679,000 | B2 | 1/2004 | Uken et al. |
| 6,763,550 | B2 | 7/2004 | Regnier |
| 6,820,368 | B2 | 11/2004 | Uken et al. |
| 6,840,011 | B2 | 1/2005 | Thompson et al. |
| 6,848,148 | B2 | 2/2005 | Braid et al. |
| 6,857,228 | B2 | 2/2005 | Kunz et al. |
| 6,860,066 | B2 | 3/2005 | Kunz et al. |
| 6,892,494 | B2 | 5/2005 | Malek |
| 6,931,788 | B2 | 8/2005 | Uken et al. |
| 6,934,998 | B1 | 8/2005 | Shuler |
| 6,983,513 | B2 | 1/2006 | Pettit |
| 6,990,710 | B2 | 1/2006 | Kunz et al. |
| 7,013,529 | B2 | 3/2006 | Pettit |
| 7,028,371 | B2 | 4/2006 | VerSteeg |
| 7,076,835 | B2 | 7/2006 | Harold et al. |
| 7,143,475 | B2 | 12/2006 | Annes et al. |
| 7,191,562 | B2 | 3/2007 | Uken et al. |
| 7,500,701 | B2 | 3/2009 | Lalancette |
| 7,552,510 | B2 | 6/2009 | Harold et al. |
| 7,568,260 | B2 | 8/2009 | Wu |
| 7,587,787 | B2 | 9/2009 | Pettit |
| 7,673,372 | B2 | 3/2010 | Annes et al. |
| 7,703,175 | B2 | 4/2010 | Tuller |
| 7,735,191 | B2 | 6/2010 | Tuller |
| 7,937,809 | B2 | 5/2011 | Tuller |
| 7,945,994 | B2 | 5/2011 | Dallas et al. |
| 7,966,770 | B1 | 6/2011 | Kunz |
| 8,074,402 | B2 | 12/2011 | Tuller |
| 8,132,290 | B2 | 3/2012 | Liang et al. |
| 8,181,396 | B1 | 5/2012 | Kunz |
| 8,313,310 | B2 | 11/2012 | Uchikado |
| 8,365,356 | B2 | 2/2013 | Robertson |
| 8,371,068 | B1 | 2/2013 | Kunz |
| 8,424,248 | B2 | 4/2013 | Uken et al. |
| 8,505,242 | B1 | 8/2013 | Kunz |
| 8,539,642 | B2 | 9/2013 | Baker |
| 8,561,260 | B2 | 10/2013 | Baker et al. |
| 8,640,383 | B1 | 2/2014 | Kunz |
| 8,813,310 | B2 | 8/2014 | Baker et al. |
| 8,819,896 | B2 | 9/2014 | Kellum, III et al. |
| 8,850,745 | B2 | 10/2014 | Sofianek |
| 8,918,979 | B2 | 12/2014 | Baker |
| RE45,328 | E | 1/2015 | Tuller |
| 8,966,822 | B2 | 3/2015 | Sofianek et al. |
| 9,003,710 | B2 | 4/2015 | Kellum, III et al. |
| 9,121,209 | B2 | 9/2015 | Baker et al. |
| 9,133,656 | B2 | 9/2015 | Steen et al. |
| 9,334,683 | B1 | 5/2016 | Kunz |
| 9,458,655 | B2 | 10/2016 | deNormand |
| 9,476,242 | B2 | 10/2016 | Baker |
| 9,580,950 | B2 | 2/2017 | Uken et al. |
| 9,644,768 | B2 | 5/2017 | Skinner |
| 9,863,176 | B2 | 1/2018 | Kellum |
| 9,995,072 | B2 | 6/2018 | Baker |
| 10,081,972 | B1 | 9/2018 | Kunz |
| 10,174,537 | B1 | 1/2019 | Kunz |
| 10,208,517 | B2 | 2/2019 | Lucci et al. |
| 10,344,514 | B2 | 7/2019 | Uken |
| 10,415,287 | B1 | 9/2019 | Kunz |
| 10,533,359 | B2 | 1/2020 | Uker |
| 10,563,440 | B2 | 2/2020 | Kellum |
| 10,563,441 | B2 | 2/2020 | Kellum |
| 10,787,849 | B1 | 9/2020 | Guelck |
| 11,136,801 | B2 | 10/2021 | Kellum |
| 11,193,318 | B2 | 12/2021 | Kellum |
| 11,560,743 | B2 | 1/2023 | Steen |
| 12,091,894 | B2 | 9/2024 | Steen |
| 12,091,895 | B2 | 9/2024 | Kellum |
| 2002/0053117 | A1 | 5/2002 | Braid et al. |
| 2002/0092241 | A1 | 7/2002 | Uken et al. |
| 2002/0104189 | A1 | 8/2002 | Braid et al. |
| 2002/0129463 | A1 | 9/2002 | Newman |
| 2003/0074764 | A1 | 4/2003 | Pettit et al. |
| 2003/0084614 | A1 | 5/2003 | Pettit |
| 2003/0192147 | A1 | 10/2003 | Braid et al. |
| 2003/0192257 | A1 | 10/2003 | Uken et al. |
| 2003/0213096 | A1 | 11/2003 | Annes et al. |
| 2003/0213661 | A1 | 11/2003 | VerSteeg |
| 2003/0226317 | A1 | 12/2003 | Thompson |
| 2004/0006845 | A1 | 1/2004 | Polowinczak et al. |
| 2004/0163209 | A1 | 8/2004 | Pettit |
| 2004/0163210 | A1 | 8/2004 | Malek |
| 2004/0168370 | A1 | 9/2004 | Pettit |
| 2004/0216380 | A1 | 11/2004 | Uken et al. |
| 2004/0237256 | A1 | 12/2004 | Lutfallah |
| 2004/0244158 | A1 | 12/2004 | Awakura et al. |
| 2004/0244295 | A1 | 12/2004 | Derham et al. |
| 2005/0016067 | A1 | 1/2005 | Pettit |
| 2005/0055802 | A1 | 3/2005 | Braid et al. |
| 2005/0091791 | A1 | 5/2005 | Kunz |
| 2005/0160676 | A1 | 7/2005 | Pettit |
| 2005/0178068 | A1 | 8/2005 | Uken et al. |
| 2005/0188620 | A1 | 9/2005 | Malek |
| 2005/0198775 | A1 | 9/2005 | Pettit et al. |
| 2005/0229492 | A1 | 10/2005 | Robertson |
| 2005/0283944 | A1 | 12/2005 | Wu |
| 2006/0021283 | A1 | 2/2006 | Schultz |
| 2006/0086052 | A1 | 4/2006 | Petta et al. |
| 2006/0207185 | A1 | 9/2006 | Shuler et al. |
| 2006/0225363 | A1 | 10/2006 | Dallas et al. |
| 2007/0011846 | A1 | 1/2007 | Braid et al. |
| 2007/0101654 | A1 | 5/2007 | Robertson |
| 2007/0113479 | A1 | 5/2007 | Uken et al. |
| 2007/0209281 | A1 | 9/2007 | Flory |
| 2008/0000047 | A1 | 1/2008 | deNormand |
| 2008/0022728 | A1 | 1/2008 | Flory |
| 2008/0047099 | A1 | 2/2008 | Malek |
| 2008/0086840 | A1 | 4/2008 | DeNormand |
| 2008/0120804 | A1 | 5/2008 | Annes et al. |
| 2008/0178424 | A1 | 7/2008 | Tuller |
| 2008/0178425 | A1 | 7/2008 | Tuller |
| 2009/0188075 | A1 | 7/2009 | Baker |
| 2009/0260295 | A1 | 10/2009 | Tuller |
| 2010/0011669 | A1 | 1/2010 | Liang |
| 2010/0115854 | A1 | 5/2010 | Uken et al. |
| 2010/0132263 | A1 | 6/2010 | Flory |
| 2010/0269292 | A1 | 10/2010 | Liang |
| 2011/0067314 | A1 | 3/2011 | Baker |
| 2011/0239402 | A1 | 10/2011 | Steen et al. |
| 2012/0297687 | A1 | 11/2012 | Baker et al. |
| 2013/0283699 | A1 | 10/2013 | Kellum, III et al. |
| 2013/0340349 | A1 | 12/2013 | Baker |
| 2014/0000172 | A1 | 1/2014 | Sofianek |
| 2014/0026490 | A1 | 1/2014 | Baker et al. |
| 2014/0208653 | A1 | 7/2014 | Sofianek et al. |
| 2014/0208655 | A1 | 7/2014 | Stoakes et al. |
| 2014/0259524 | A1 | 9/2014 | Kellum, III et al. |
| 2014/0259936 | A1 | 9/2014 | DeNormand et al. |
| 2014/0331561 | A1 | 11/2014 | Baker et al. |
| 2015/0167379 | A1 | 6/2015 | Sofianek et al. |
| 2015/0361701 | A1 | 12/2015 | Steen et al. |
| 2015/0368952 | A1 | 12/2015 | Baker et al. |
| 2016/0222709 | A1 | 8/2016 | Wynder |
| 2016/0298368 | A1 | 10/2016 | Kunz |
| 2016/0298369 | A1 | 10/2016 | Kunz |
| 2017/0089109 | A1 | 3/2017 | Steen et al. |
| 2017/0145722 | A1 | 5/2017 | Kellum, III |
| 2017/0211305 | A1 | 7/2017 | Uken et al. |
| 2017/0292303 | A1 | 10/2017 | Lucci |
| 2017/0370138 | A1 | 12/2017 | Uken et al. |
| 2018/0291660 | A1 | 10/2018 | Kellum |
| 2019/0003228 | A1 | 1/2019 | Seiling |
| 2019/0085609 | A1 | 3/2019 | Kellum |
| 2020/0018105 | A1 | 1/2020 | McDuff |
| 2020/0040630 | A1 | 2/2020 | Newman |
| 2020/0157863 | A1 | 5/2020 | Kellum |
| 2020/0217116 | A1 | 7/2020 | Kellum |
| 2020/0224472 | A1 | 7/2020 | Jken |
| 2020/0318408 | A1 | 10/2020 | Steen |
| 2021/0156181 | A1 | 5/2021 | Welbig |

(56) References Cited

U.S. PATENT DOCUMENTS

| | | | |
|---|---|---|---|
| 2021/0164278 A1 | 6/2021 | Steen |
| 2021/0246697 A1 | 8/2021 | Kellum |
| 2022/0034138 A1 | 2/2022 | Kellum |
| 2023/0127447 A1 | 4/2023 | Steen |
| 2024/0426154 A1 | 12/2024 | Steen |

FOREIGN PATENT DOCUMENTS

| | | |
|---|---|---|
| CA | 2338403 | 4/2006 |
| CA | 2596293 | 2/2008 |
| CA | 2619267 | 7/2008 |
| CA | 2619289 | 7/2008 |
| CA | 2820240 | 1/2014 |
| CA | 2836375 | 7/2014 |
| CA | 2974594 | 1/2018 |
| CN | 1430693 A | 7/2003 |
| CN | 101463697 A | 6/2009 |
| CN | 106715814 A | 5/2017 |
| GB | 329996 | 5/1930 |
| GB | 723056 | 2/1955 |
| GB | 740223 | 11/1955 |
| GB | 1505782 | 3/1978 |
| GB | 2195691 | 4/1988 |
| GB | 2236786 | 4/1991 |
| GB | 2254875 | 10/1992 |
| GB | 2276655 | 10/1994 |
| GB | 2278626 | 12/1994 |
| GB | 2280697 | 2/1995 |
| GB | 2292168 | 2/1996 |
| GB | 2295634 | 6/1996 |
| GB | 2298892 | 9/1996 |
| GB | 2387409 | 10/2003 |
| JP | 56-171982 | 12/1981 |
| JP | 63-3785 | 1/1988 |
| JP | 2002242527 | 8/2002 |
| JP | 2004293388 | 10/2004 |
| TW | 201518594 A | 5/2015 |

OTHER PUBLICATIONS

BSI Tilt Balance Systems, Balance Systems—BSI, Amesbury Group, Inc., 1996-2001, 4 pgs.

BSI's Hidden Advantage: It's as Easy as 1-2-3, Balance Systems—BSI, Amesbury Group, Inc., 2001, 3 pgs.

Crossbow Balance! Another New Balance in BSI's Quiver, Balance Systems—BSI, Amesbury Group, Inc., Jun. 7, 1999, 2 pgs.

Dakota Balance—Balances and Accessories brochure, May 2001, 2 pgs.

DWM Door & Window Maker Magazine, "2004 Annual Buyers Guide", vol. 5, Issue 3, Apr. 2004, 2 pgs.

Heinberg, "Latest Trends in Window and Door Hardware," Shelter Magazine, Jul. 2001, cover and p. 11.

PCT International Preliminary Report on Patentability in Application PCT/US2018/026500, mailed Oct. 17, 2019, 7 pages.

PCT International Search Report and Written Opinion in International Application PCT/US2018/026500, mailed Jun. 22, 2018, 13 pages.

PCT International Search Report, Written Opinion, and International Preliminary Report on Patentability (with 37 sheets of annexes) for PCT/US2011/024134; ISA/US, Feb. 9, 2011 (113 pages total).

WINDOW BALANCE SHOES FOR A PIVOTABLE WINDOW

CROSS-REFERENCE TO RELATED APPLICATIONS

This application is a continuation of U.S. patent application Ser. No. 17/451,792, now U.S. Pat. No. 12,091,895, filed Oct. 21, 2021, which is a continuation of U.S. patent application Ser. No. 16/136,650, now U.S. Pat. No. 11,193,318, filed Sep. 20, 2018, which claims priority to and the benefit of U.S. Provisional Patent Application No. 62/561,580, filed on Sep. 21, 2017, the entire disclosures of which are incorporated herein by reference in their entireties.

INTRODUCTION

Pivotable double hung windows can include two window sashes disposed in tracks located in a window frame to allow vertical sliding movement of the sashes. Pivot bars can be provided to allow rotational movement of the window sashes about the pivot bars to facilitate cleaning and/or removal of the sash. To control vertical movement, window balances are used so that the window sashes remain in a position in which they are placed. Balance shoes are also used to guide the rotational movement of the window sashes with respect to the window frame, as well as lock the window sash in position when pivoted.

Various types of balance systems are known and are used to counterbalance the weight of the window sash. For example, block and tackle systems include a system of pulleys and an extension spring mounted within a rigid channel, and are relatively compact in size and easy to install.

SUMMARY

In an aspect, the technology relates to a balance shoe for a block and tackle window balance system, the balance shoe including: an enlarged head portion housing a locking system configured to receive at least a portion of a pivot bar and releasably engage a jamb track; an elongate tail portion configured to couple at least partially within a U-shaped channel of the window balance system; a front face, wherein the front face of the elongate tail portion is adjacent to a base wall of the U-shaped channel when the elongate tail portion is coupled therein, and wherein the front face includes an elongate channel configured to allow passage of the pivot bar from the elongate tail portion towards the locking system; and at least one protrusion extending from the front face of the elongate tail portion and disposed at least partially within the elongate channel.

In an example, the at least one protrusion is configured to engage with the base wall of the U-shaped channel. In another example, the at least one protrusion engages with the base wall in a resilient connection. In still another example, the at least one protrusion is configured to restrict a pullout force of the elongate tail portion from the U-shaped channel. In yet another example, the at least one protrusion is configured to transfer a load between the elongate tail portion and the U-shaped channel in shear. In an example, a rear face is opposite of the front face, and the at least one protrusion includes a face surface that is substantially parallel with the rear face.

In another example, the at least one protrusion includes a curved top wall. In still another example, at least one connecting device extends from the elongate tail portion and is configured to engage with a sidewall of the U-shaped channel. In yet another example, the elongate tail portion defines a longitudinal axis, and the at least one connecting device includes an arm extending along the longitudinal axis. In an example, a projection extends from the arm, and the projection tapers in a direction that is outward from the arm and away from the front face.

In another aspect, a block and tackle window balance system including: a U-shaped channel including a base wall and two opposing sidewalls housing at least partially a block and tackle balance assembly, wherein the U-shaped channel includes a first end having a fastener extending between the two sidewalls and at least one opening defined within the base wall; and a balance shoe coupled to the fastener, wherein the balance shoe includes: an enlarged head portion extending from the first end of the U-shaped channel; a locking system housed within the enlarged head portion configured to receive at least a portion of a pivot bar and releasably engage a jamb track; an elongate tail portion received at least partially within the U-shaped channel; a front face adjacent to the base wall of the U-shaped channel, wherein the front face includes an elongate channel configured to allow passage of the pivot bar from the elongate tail portion towards the locking system; and at least one protrusion extending from the front face of the elongate tail portion and disposed at least partially within the elongate channel, wherein the at least one protrusion engages with the at least one opening.

In an example, the base wall includes a ramped portion at the first end of the U-shaped channel. In another example, the ramped portion corresponds in size and shape to the elongate channel and is configured to allow passage of the pivot bar towards the locking system. In still another example, the at least one opening corresponds in size and shape to the at least one protrusion. In yet another example, the balance shoe further includes two connecting devices, each extending from opposite sides of the elongate tail portion and configured to engage with the two sidewalls of the U-shaped channel. In an example, an aperture is defined in each sidewall of the U-shaped channel at the first end, and the aperture is configured to receive at least a portion of the corresponding connecting device. In another example, a dimple is formed in the sidewall of the U-shaped channel proximate the aperture.

In another aspect, the technology relates to a method of assembling a block and tackle window balance system, the method including: engaging a balance shoe with a fastener extending across a U-shaped channel in a first orientation, wherein the U-shaped channel includes a base wall and two opposing sidewalls; pivoting the balance shoe into a different second orientation relative to the U-shaped channel, wherein in the second orientation an elongated tail portion of the balance shoe is disposed at least partially within the U-shaped channel and an enlarged head portion of the balance shoe extends from the U-shaped channel; and substantially simultaneously with pivoting the balance shoe, engaging at least one protrusion of the balance shoe with at least one corresponding opening defined in the base wall of the U-shaped channel, wherein the at least protrusion extends from a front face of the balance shoe and at least partially within an elongate channel of the balance shoe, and wherein the elongate channel is positioned adjacent to the base wall of the U-shaped channel in the second orientation and is configured to allow passage of a pivot bar.

In an example, the method further includes engaging at least one connecting device of the balance shoe with a sidewall of the U-shaped channel. In another example, engaging the at least one connecting device includes sliding at least a portion of the connecting device through a dimple formed in the sidewall of the U-shaped channel.

BRIEF DESCRIPTION OF THE DRAWINGS

There are shown in the drawings, examples which are presently preferred, it being understood, however, that the technology is not limited to the precise arrangements and instrumentalities shown.

DETAILED DESCRIPTION

The examples of a balance shoe for an inverted block and tackle window balance system described herein provide a more robust connection between the shoe and the U-shaped channel. Accordingly, performance and efficiency of the installation and operation of the window balance system is increased. Additionally, heavier window sashes may be supported within the hung window assembly. In aspects, the balance shoe includes a front facing elongated channel that allows passage of a pivot bar to the locking system of the shoe. One or more protrusions are disposed within the elongated channel that are configured to engage with the U-shaped channel of the block and tackle balance system. The protrusion is configured to increase the shear strength of the shoe and U-shaped channel connection. Additionally, the protrusion can increase the pullout force required to disengage the shoe from the U-shaped channel. In other aspects, the balance shoe includes a connection device that is configured to engage with the sidewalls of the U-shaped channel. The connection devices have a flexible arm with a projection extending therefrom. The length of the flexible arm is reduced compared to known balance shoes so as to increase the strength of the connection device and U-shaped channel connection. Additionally, the projection includes a tapered section that increases the wear resistance of the connection device.

Figure 1:
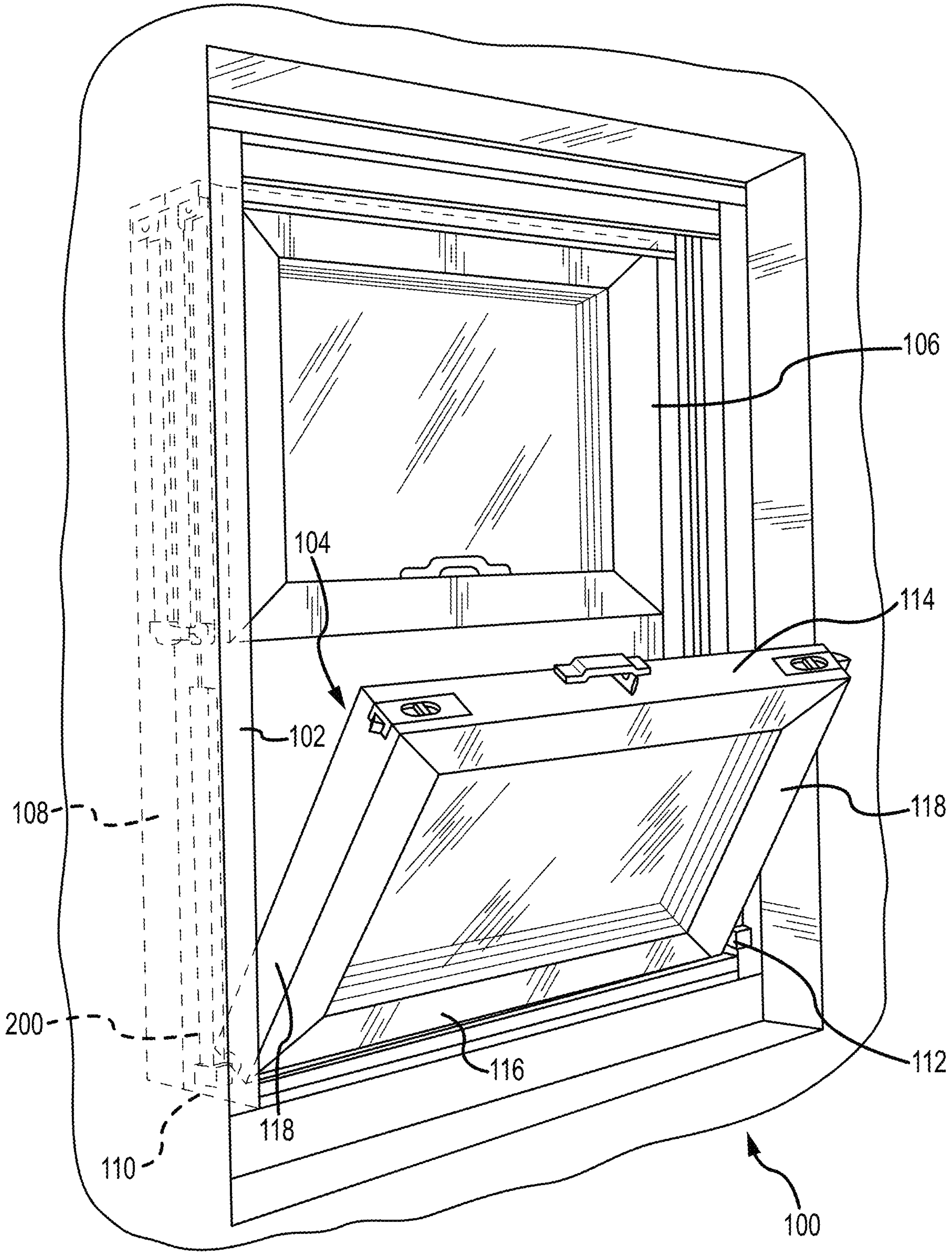
FIG. 1 is a perspective view of a pivotable double hung window assembly.

FIG. 1 is a perspective view of a pivotable double hung window assembly 100 for which a window balance shoe as described herein may be used. The pivotable double hung window assembly 100 includes a window frame 102, a pivotable lower window sash 104, a pivotable upper window sash 106, and a window jamb 108. The pivotable lower window sash 104 and the pivotable upper window sash 106 slide vertically in a jamb track 110 within the window jamb 108, while also being able to pivot about a pivot bar 112. Each window sash 104, 106 includes a top sash rail 114, a base sash rail 116, and a pair of vertical stiles 118. In other examples, the window assembly 100 may be a single hung window assembly in which only the lower window sash 104 is pivotable and slidable.

A window balance system 200 is mounted within the jamb track 110 and provides a counter balance force to the window sashes 104, 106. Additionally, the window balance system 200 guides the pivoting movement of the window sashes 104, 106 and locks in position within the jamb track 110 during the pivoting and/or removal of the window sashes 104, 106. In the example, the window balance system 200 is a block and tackle window balance system, although other balance systems (e.g., constant force balances) may be used as required or desired. The window balance system 200 is described in reference to FIG. 2 below.

Figure 2:
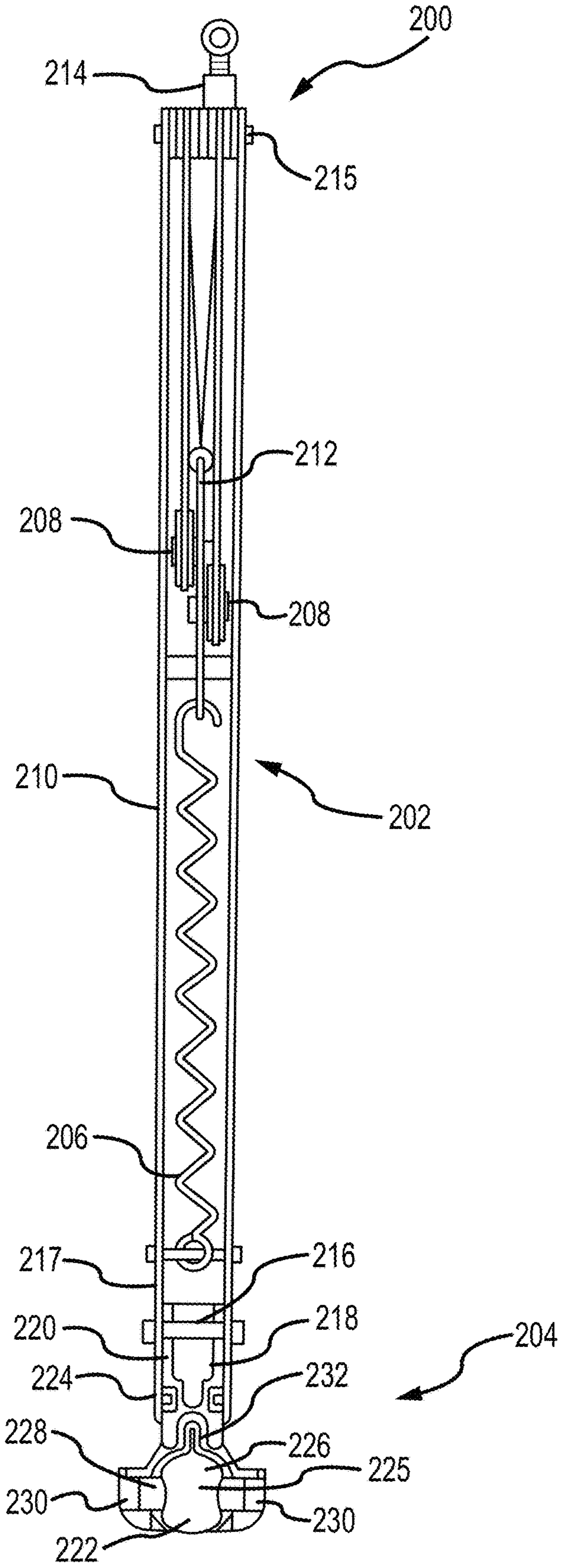
FIG. 2 is a rear view of an exemplary window balance system.

FIG. 2 is a rear view of the exemplary window balance system 200. The window balance system 200 includes an inverted window balance 202 that is used for balancing the weight of the window sash within the window frame, and a window balance shoe 204 for guiding the rotation of the window sash about a pivot bar as described above. In the example, the inverted window balance 202 is a block and tackle type window balance and includes an extension spring 206 connected to a system of pulleys 208 housed within a rigid U-shaped channel 210. A cord 212 connects the system of pulleys 208 to a jamb mounting attachment 214, such as a cord terminal or hook, at a top end 215 of the U-shaped channel 210. Opposite the jamb mounting attachment 214, a fastener 216 (e.g., a rivet) extends across the U-shaped channel 210 at a bottom end 217 of the U-shaped channel 210. The balance shoe 204 is coupled (e.g., resiliently secured) to the inverted window balance 202 at the bottom end 217 of the U-shaped channel 210.

The balance shoe 204 includes a substantially T-shaped body 218 with an elongate tail portion 220 that is configured to be at least partially received within the U-shaped channel 210 and couple to the fastener 216, and an enlarged head portion 222 that extends from the bottom end 217 of the U-shaped channel 210. The elongate tail portion 220 includes one or more connecting devices 224 that engage with the U-shaped channel 210 and enable the balance shoe 204 to at least be partially secured within the U-shaped channel 210. The enlarged head portion 222 houses a locking system 225 that is configured to receive at least a portion of the pivot bar of the window sash and releasably engage the jamb track. The locking system 225 includes a rotatable cam 226 and a locking device 228. The locking device 228 surrounds the cam 226 and includes a pair of opposing ends 230 connected by a spring member 232. The cam 226 is configured to receive the pivot bar of the pivotable window sash such that when the sash is tilted open, the pivot bar rotates, thereby rotating the cam 226 and forcing the opposing ends 230 of the locking device 228 outward from the enlarged head portion 222 to engage the jamb track of the window frame and to lock the balance shoe 204 in location.

Additional examples of T-shaped balance shoes that may be used with the inverted window balance, methods of assembly of inverted window balances, and methods of installation thereof are described further in U.S. Pat. No. 6,679,000, filed Jan. 11, 2002, and entitled "SNAP LOCK BALANCE SHOE AND SYSTEM FOR A PIVOTABLE WINDOW," the disclosure of which is hereby incorporated by reference herein in its entirety.

FIG. 2 illustrates the rear view of the window balance system 200, which is the side that faces the jamb track when mounted within the window jamb. As such, the U-shaped channel 210 at least partially covers the block and tackle assembly (e.g., the spring 206, the pulleys 208, and the cord 212) and restricts access thereto. Additionally, the U-shaped channel 210 restricts or prevents dirt and debris from accumulating on the block and tackle assembly. In this orientation, however, the bottom end 217 of the U-shaped channel 210 may make sash installation more difficult due to the proximity of the bottom end 217 to a keyhole opening 273 (shown in FIGS. 3B and 3C) in the cam 226. As such, the U-shaped channel 210 and the balance shoe 204 include features that enable the pivot bar to more easily pass to the cam 226 and make sash installation more efficient.

Figure 3A:
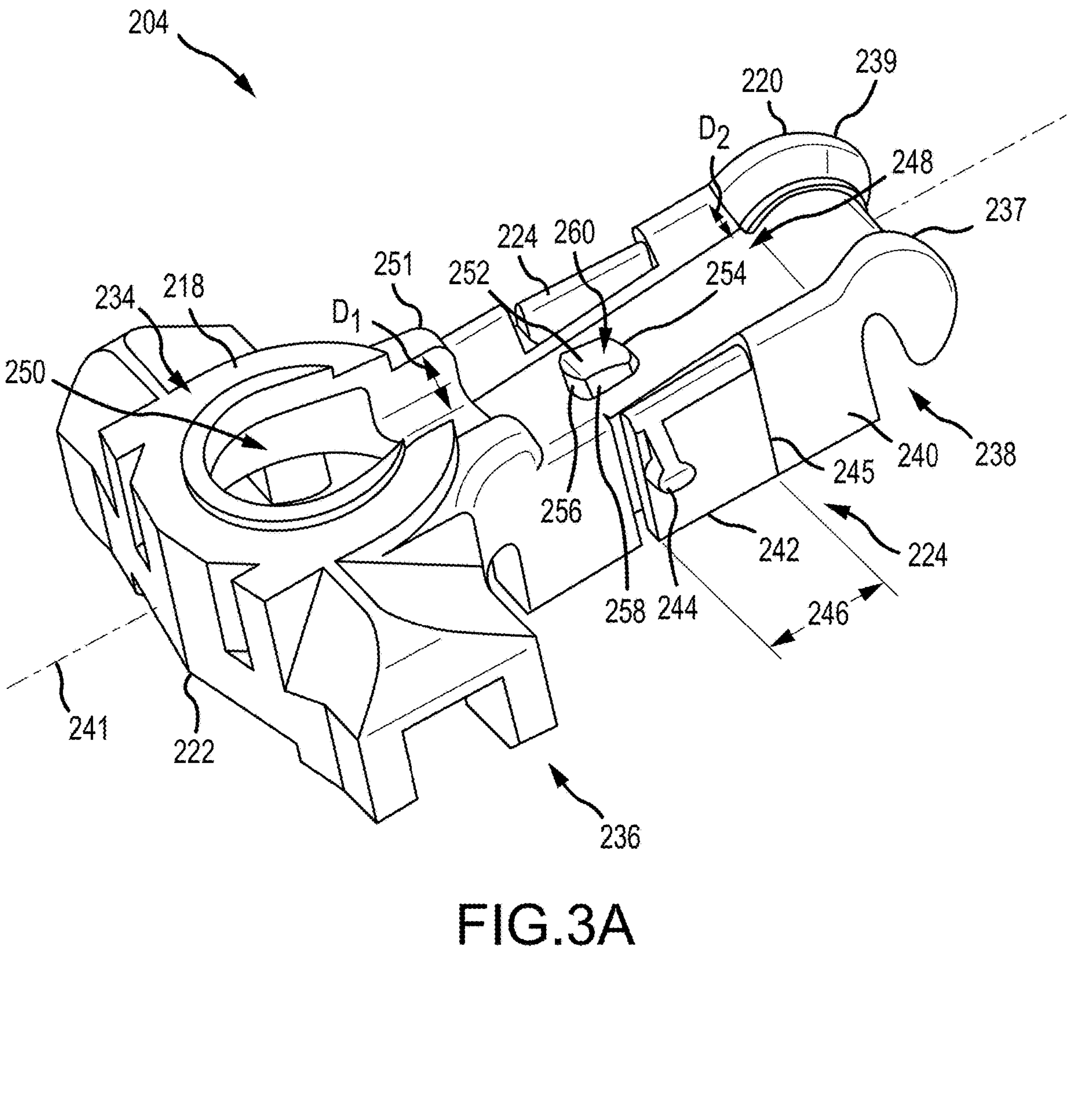
FIG. 3A is a perspective view of an exemplary window balance shoe of the window balance system shown in FIG. 2.

FIG. 3A is a perspective view of the window balance shoe 204 of the window balance system 200 (shown in FIG. 2). In FIG. 3A the locking system 225 (also shown in FIG. 2) is not illustrated for clarity. In the example, the shoe body 218 has a front face 234 that is configured to allow passage of the pivot bar to the locking system during window sash installation and an opposite back face 236 that is configured to slide against the jamb track wall. As such, the front face 234 is configured to mount into and adjacent to the U-shaped channel 210 (shown in FIG. 3B), and the back face 236 is substantially planar with the U-shaped channel 210 so that the balance shoe 204 can slide up and down in the window jamb during use. The balance shoe 204 enables the window sash, via the pivot bar, to be coupled to the window balance and facilitate the vertical sliding movement and the pivoting movement of the window sash within the window jamb.

A connection pocket 238 is defined in the back face 236 of the elongate tail portion 220 and towards a top end 237 of the balance shoe 204, which is opposite the enlarged head portion 222. Thus, the top end 237 of the balance shoe 204 defines a hook 239 that is configured to secure to the fastener 216 of the U-shaped channel 210 (both shown in FIG. 3B). The hook 239, when engaged with the fastener 216 (shown in FIG. 2), enables the window load supported by the balance shoe 204 to be transferred (e.g., via shear force resistance) to the U-shaped channel and the block and tackle balance components. As such, when the balance shoe 204 is connected to the U-shaped channel and installed in the window jamb, the weight of the window is supported by the balance shoe 204 so that the window sash can move along a longitudinal axis 241. This longitudinal axis 241 is substantially parallel to the jamb channel and is also substantially parallel with a longitudinal axis of the balance shoe 204. In the example, the connection pocket 238 extends from the back face 236 toward the front face 234 and is sized and shaped to receive the fastener 216 (shown in FIG. 2). For example, the connection pocket 238 is substantially orthogonal to the back face 236 and the longitudinal axis 241. In alternative examples, the connection pocket 238 may be angled or curved so as to receive the fastener, or may be a through-hole entirely defined by the elongate tail portion 220 such that the fastener extends therethrough.

Figure 3B:
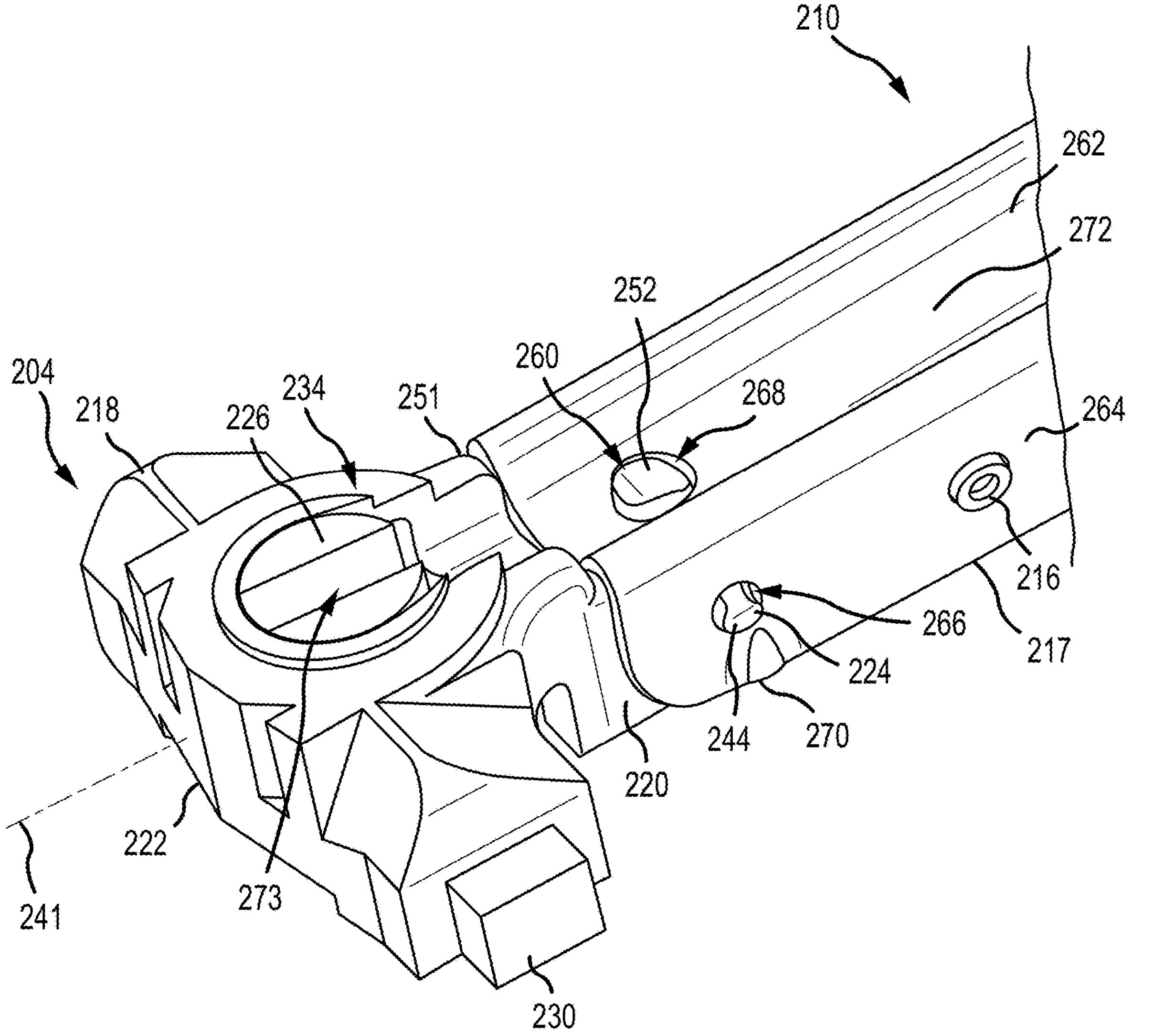
FIG. 3B is a perspective view of the window balance shoe shown in FIG. 3A coupled to a U-shaped channel of the window balance system shown in FIG. 2 in a locked configuration.

The elongate tail portion 220 is sized and shaped to be received and secured within the U-shaped channel 210 (shown in FIG. 3B). In addition to the connection pocket 238, the elongate tail portion 220 includes additional features that enable the balance shoe 204 to be received within the U-shaped channel 210 and prevent the shoe 204 from rotating about the fastener and out of the U-shaped channel, which is undesirable. In the example, the elongate tail portion 220 includes two opposing sidewalls 240 that extend between the front face 234 and the back face 236, and along the longitudinal axis 241. Each sidewall 240 includes the connecting device 224, which is configured to be resiliently secured to the U-shaped channel and prevent the elongate tail portion 220 from disengaging from the U-shaped channel (e.g., pulling out of the U-shaped channel and/or from rotating out of the U-shaped channel).

The connecting devices 224 include a resilient, flexible arm 242 extending along and substantially parallel to the longitudinal axis 241 of the elongate tail portion 220. The arm 242 includes an engagement projection 244, such as a tab, located at the free end of the arm 242 and extending outwards from the elongate tail portion 220. The projection 244 is shaped and sized to engage with a corresponding aperture 266 (shown in FIG. 3B) defined in the U-shaped channel and lock the balance shoe 204 to the U-shaped channel. In the example, the projection 244 tapers in a direction that is outwards from the arm 242 (e.g., substantially perpendicular to the longitudinal axis 241) and away from the front face 234 towards the back face 236. That is, the height of the projection 244 is greater at the back face 236 than the front face 234. This taper of the engagement projection 244 provides added material to the side of the projection 244 that slides against the U-shaped channel to reduce or eliminate wear on the projection 244 during shoe installation.

Each resilient arm 242 is disposed substantially parallel to an adjacent sidewall 240, but spaced therefrom, and is configured to deflect towards the longitudinal axis 241. As such, the arm 242 is connected to and extends from the sidewall 240 at a line of flexure 245, and may be at least partially skew to the longitudinal axis 241. Because of the flexure of the arm 242, when the balance shoe 204 is inserted within the U-shaped channel, the U-shaped channel forces the arm 242 to deflect until the engagement projection 244 engages with the U-shaped channel. More specifically, the engagement projection 244 is configured to engage, for example, via a resilient-fit connection, with a corresponding aperture 266 of the U-shaped channel 210 (shown in FIG. 3B). Additionally, the arm 242 has a length 246 that is sized so as to reduce excessive flexure and wear to the connecting device 224. Excessive flexure may prevent engagement between the engagement projection 244 and the U-shaped channel. Furthermore, reducing the length 246 of the arm 242 enables engagement with the U-shaped channel to be strengthened by providing a greater retention force generated by the flex of the arm 242. In the example, the connecting devices 224 may be used in concert with the hook 239/connection pocket 238 to at least partially secure the balance shoe 204 to the inverted window balance 202 (shown in FIG. 2). In other examples, the connecting device 224 may be used without the hook 239/connection pocket 238 to couple the balance shoe 204 to the inverted window balance.

An elongate channel 248 is defined within the front face 234 of the balance shoe 204 and within elongate tail portion 220. The elongate channel 248 extends from approximately the top end 237 of the elongate tail portion 220 towards a cam opening 250 defined in the enlarged head portion 222. The cam opening 250 is sized and shaped to house the cam 226 (shown in FIG. 2) and enable the cam to rotate therein to extend and retract the ends 230 (also shown in FIG. 2) and lock and unlock the balance shoe 204 within the window jamb. The elongate channel 248 is recessed within the front face 234 and allows passage of the pivot bar from the elongate tail portion 220 towards the cam opening 250. As such, the pivot bar may be easily inserted into the cam during window sash installation (e.g., without the need to rack the window). The elongate channel 248 is ramped or pitched and extends from the top end 237 of the elongate tail portion 220 to a lead-in lip 251 proximate the cam opening 250, to facilitate guiding the pivot bar towards the enlarged head portion 222 and into the cam keyhole opening 273 (shown in FIGS. 3B and 3C). That is, the elongate channel 248 extends deeper in depth $D_1$ within the front face 234 at the lip 251 than at the top end 237 of the elongate tail portion 220 at a depth $D_2$.

The elongate tail portion 220 also includes a protrusion 252 that extends from the front face 234 of the elongate tail portion 220 and is disposed at least partially within the elongate channel 248. The protrusion 252 is sized and shaped to be received within an opening 268 (shown in FIG. 3B) defined within the U-shaped channel 210 so that the balance shoe 204 is engaged with the U-shaped channel at yet another location. In the example, the protrusion 252 is substantially rectangular or square shaped. In other examples, the protrusion 252 may have any other shape that enables the balance shoe 204 to function as described herein, such as, circular, rectangular, mushroom-shaped (see FIG. 6), triangular, linear, and the like. In the example, the protrusion 252 acts in concert with either or both of the hook 239/connection pocket 238 and the connecting devices 224 to secure the balance shoe 204 to the inverted window balance. In other examples, the protrusion 252 may be the only connection element to the U-shaped channel. In yet other examples, the protrusion 252 may be used in concert with only the hook 239/connection pocket 238 to secure the balance shoe 204 to the U-shaped channel.

The protrusion 252 when engaged with the U-shape channel, enables the window load supported by the balance shoe 204 to be transferred (e.g., via shear force resistance) to the U-shaped channel and the block and tackle balance components. Additionally or alternatively, the protrusion 252 may be configured to engage with the U-shaped channel and prevent the elongate tail portion 220 from disengaging from the U-shaped channel (e.g., pulling out of the U-shaped channel and/or from rotating out of the U-shaped channel). In an aspect, the protrusion may be resiliently secured within the U-shaped channel and reduce or eliminate the likelihood of disconnection (e.g., a pullout force) when the window balance is transported and/or installed.

In the example, the protrusion 252 has a top wall 254, a bottom wall 256, two sidewalls 258, and a face surface 260 and is disposed at least partially within the elongate channel 248. The top wall 254 and/or the bottom wall 256 may be curved. In other examples, the walls 254, 256 may be linear and either substantially orthogonal or angled relative to the sidewalls 258. The face surface 260 may be sloped relative to the elongate channel 248. As such, the top wall 254 of the protrusion 252 has a smaller height than the bottom wall 256 of the protrusion 252. Additionally, the face surface 260 is disposed below the plane of the font face 234 formed by the sidewalls 240. This enables the pivot bar to more easily pass over the protrusion 252 when the window sash is being dropped into the balance shoe 204 and the protrusion 252 does not interfere with the operation of the hung window assembly.

In some examples, the face surface 260 may be parallel to the tapered slope of the elongate channel 248. In other examples, the face surface 260 may be substantially flat, for example, the face surface 260 may be substantially parallel with the back face 236 of the balance shoe 204. In yet other examples, the face surface 260 may be curved or rounded. In still other examples, one or more of the walls 254-258 of the protrusion 252 may include a lip so that the protrusion 252 can more securely engage with the U-shaped channel. For example, the lip may facilitate a resilient connection between the balance shoe 204 and the U-shaped channel.

As illustrated in FIG. 3A, the protrusion 252 is positioned on the elongate tail portion 220 such that it is aligned with the engagement projections 244 and is offset from the sidewalls 240. In other examples, the protrusion 252 may be positioned at any other location on the elongate tail portion 220 as required or desired. For example, the protrusion 252 may be positioned more proximate the top end 237 of the elongate tail portion 220. In another example, the protrusion 252 may be positioned more towards or adjacent to the sidewalls 240 of the balance shoe 204. In yet another example, the protrusion 252 may be divided into two parts, with each part adjacent to opposite sidewalls 240.

Figure 3C:
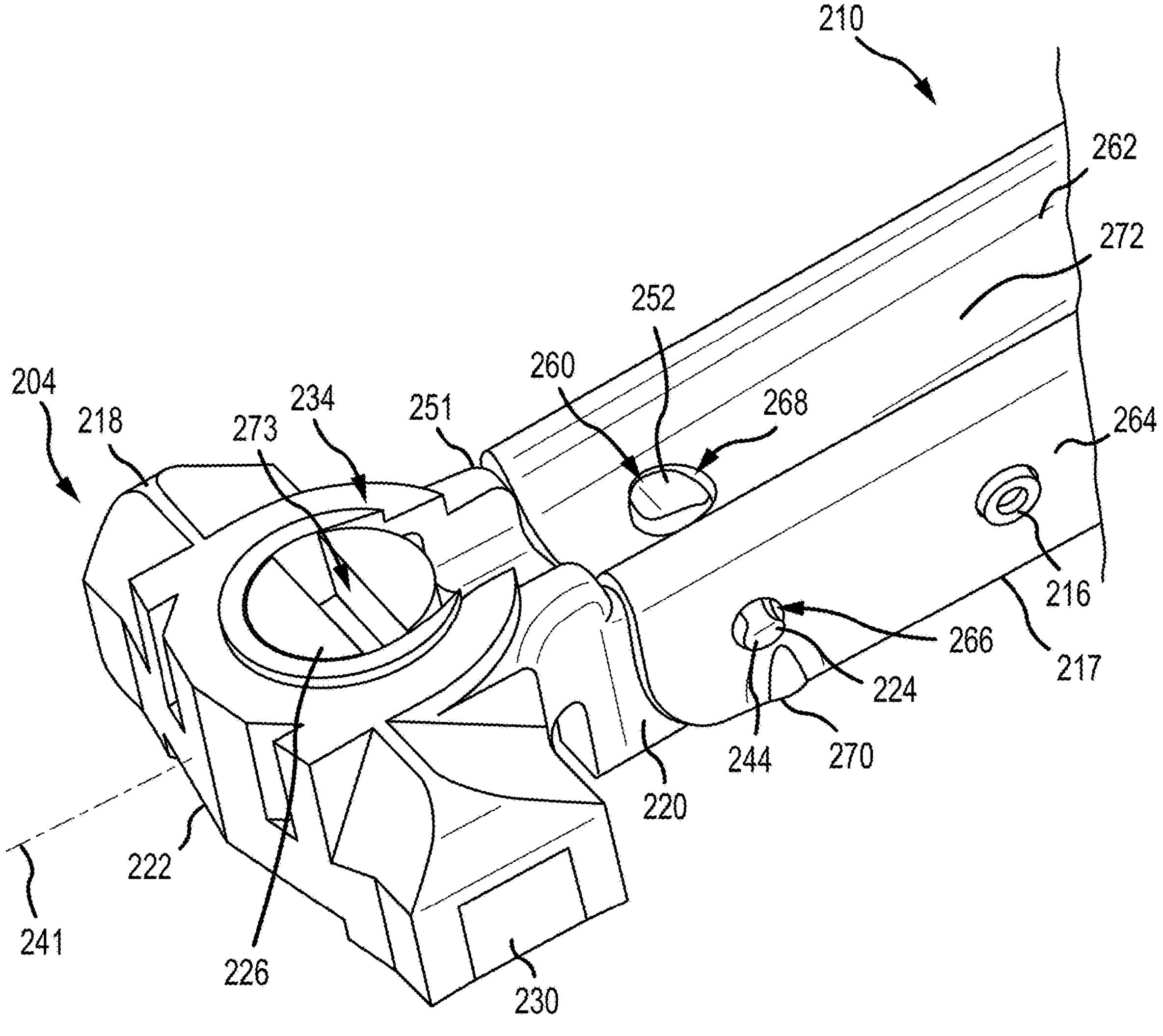
FIG. 3C is a perspective view of the window balance shoe shown in FIG. 3A coupled to a U-shaped channel of the window balance system shown in FIG. 2 in an unlocked configuration

FIG. 3B is a perspective view of the window balance shoe 204 coupled to the U-shaped channel 210 and in a locked configuration. FIG. 3C is a perspective view of the window balance shoe 204 coupled to the U-shaped channel 210 and in an unlocked configuration. Referring concurrently to FIGS. 3B and 3C, the U-shaped channel 210 includes a base wall 262 and two sidewalls 264 extending therefrom. At the bottom end 217 of the U-shaped channel 210, the fastener 216 extends between the two sidewalls 264. Additionally or alternatively, the U-shaped channel 210 includes at least one aperture 266 defined in each sidewall 264 that is sized and shaped to receive and engage the projection 244 of the connecting device 224. The U-shaped channel 210 also includes an opening 268 defined in the base wall 262 that is sized and shaped to receive and engage with the protrusion 252. When the balance shoe 204 is coupled to the U-shaped channel 210, the front face 234 of the balance shoe 204 is adjacent to the base wall 262 and the protrusion 252 is disposed in the pivot bar travel path during operation of the hung window assembly.

To install and secure the balance shoe 204 within the U-shaped channel 210, the elongate tail portion 220 is advanced at an angle into the U-shaped channel 210 so that the hook 239 (shown in FIG. 3A) engages with the fastener 216. That is, the fastener 216 is received within the connection pocket 238 (shown in FIG. 3A). The balance shoe 204 is then rotated about the fastener 216 so that the front face 234 is positioned within the U-shaped channel 210 against an interior surface of the base wall 262 and between the two sidewalls 264 so as to be aligned with the balance shoe 204 along the longitudinal axis 241. As the balance shoe 204 is rotated, the connecting devices 224 engage with the corresponding apertures 266 within the sidewalls 264 of the U-shaped channel 210. This assembly sequence is depicted, for example, in U.S. Pat. No. 6,679,000 at FIGS. 6A-6D, the disclosure of which is hereby incorporated by reference herein. In this example, however, one or more dimples 270 may be formed on each sidewall 264 of the U-shaped channel 210 proximate the apertures 266. These dimples 270 extend outward from the sidewalls 264 so as to facilitate deflection of the connecting device arms while the engagement projection 244 slides into the aperture 266. As such, wear on the connecting devices 224 is reduced during balance shoe 204 assembly. In some examples, the engagement projection 244 may be received within the aperture 266 such that the balance shoe 204 and the U-shaped channel 210 are engaged in a resilient connection.

Additionally, as the balance shoe 204 is rotated into the U-shaped channel 210, the protrusion 252 is received within and engages with the opening 268 located on the base wall 262 of the U-shaped channel 210. In some examples, the protrusion 252 may be received within the opening 268 such that the balance shoe 204 and the U-shaped channel 210 are engaged in a resilient connection. In the example, the base wall 262 of the U-shaped channel 210 may include a ramped portion 272 that is disposed at the bottom end 217. The ramped portion 272 tapers inward towards the sidewalls 264 so as to allow passage of the pivot bar into the balance shoe 204 during window sash installation. In the example, the ramped portion 272 may correspond in size and shape to the elongate channel 248 of the elongate tail portion 220. This allows the ramped portion 272 in the U-shaped channel 210 to be flush or substantially flush with the lip 251 of the balance shoe 204, thus, enabling insertion of the pivot bar to the locking system while reducing potential interference. By forming a grooved ramp in both the balance shoe 204 and the U-shaped channel 210, wider width window sashes may be used with the window balance systems as the bottom end 217 of the U-shaped channel 210 does not block the drop-in of the pivot bars.

In the example, at least a portion of the front surface 260 of the protrusion 252 extends above the U-shaped channel 210 and may be shaped and sized to direct the pivot bar up and over, or around, the protrusion 252 so that the pivot bar does not catch on the protrusion 252 as it is inserted into the cam. In other examples, the walls 254-258 of the protrusion 252 may terminate before the outer surface of the U-shaped channel 210 so that the pivot bar does not catch on the protrusion 252. In the example, the balance shoe 204 is coupled to the U-shaped channel 210 via the hook 239 (shown in FIG. 3A), the connecting devices 224, and the protrusion 252. In other examples, only the protrusion 252 and hook 239/connection pocket 238 are used to secure the balance shoe 204 within the U-shaped channel 210, while in yet other examples only the protrusion 252 may be utilized.

In the example, FIG. 3B illustrates the cam 226 being in a locked position such that a keyhole opening 273 is aligned with the ramped portion 272 and the elongate channel 248 (shown in FIG. 3A) so as to receive the pivot bar of the window sash. In the locked position, the ends 230 extend out of the enlarged head portion 222 to engage with the window jamb walls and secure the position of the balance shoe 204 within the jamb track. The locked position also enables the pivot bar to be inserted and/or removed from the cam 226 as required or desired. In contrast, FIG. 3C illustrates the cam 226 in an unlocked position such that the keyhole opening 273 is rotated approximately 90° and the ends 230 are retracted at least partially within the enlarged head portion 222. In the unlocked position, the window balance shoe 204 can slide within the window jamb as the window sash is raised or lowered.

Figure 4A:
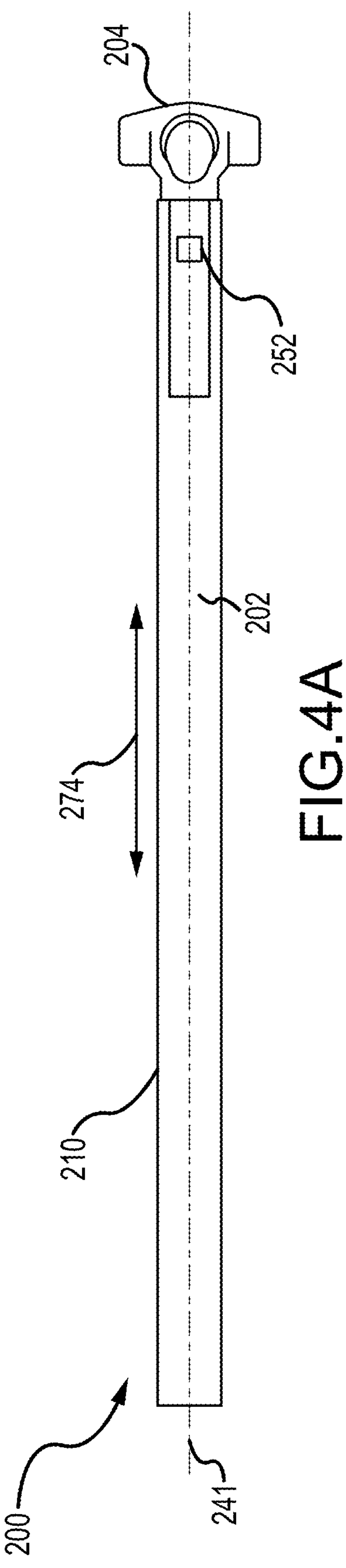
FIGS. 4A and 4B are schematic views of loading forces that act on the window balance system shown in FIG. 2.
Figure 4B:
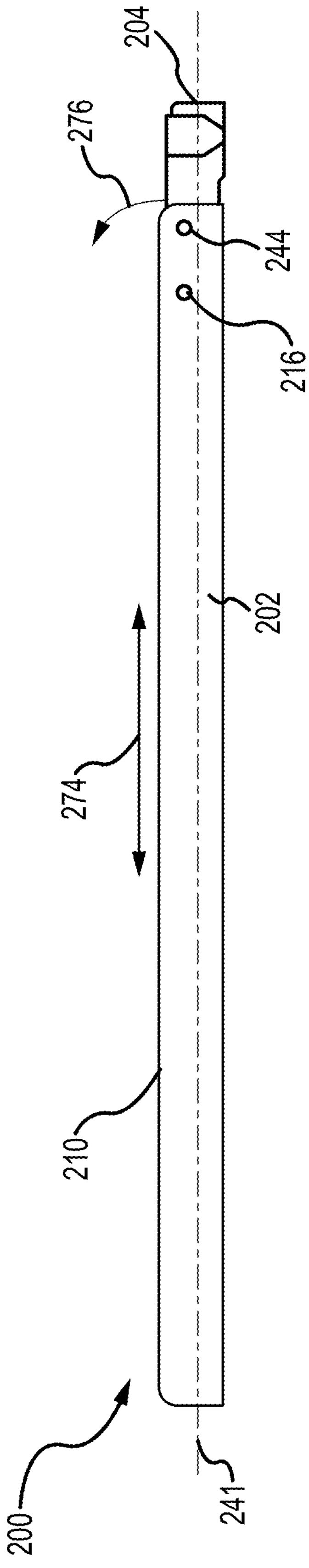

FIGS. 4A and 4B are schematic views of loading forces that act on the window balance system 200. Referring concurrently to FIGS. 4A and 4B, the window balance system 200 is a block and tackle system that includes the balance shoe 204 that is directly attached to the U-shaped channel 210 of the inverted window balance 202. The balance shoe 204 is coupled to the U-shaped channel 210 with the connection pocket 238 (shown in FIG. 3A) engaged with the fastener 216, the engagement projection 244 is engaged with the U-shaped channel 210, and the protrusion 252 is engaged with the U-shaped channel 210. As such, three load transfer points are formed, one for each connection. Because the window sash is supported by the balance shoe 204, via the pivot pins, and the balance spring is supported within the U-shaped channel 210, the operational loads must be transferred between the U-shaped channel 210 and the balance shoe 204 in order to facilitate hung window operation.

In operation, the weight of the window sash and the movement thereof creates a longitudinal load 274 that acts along the longitudinal axis 241 of the window balance system 200. This longitudinal load 274 is transferred between the balance shoe 204 and the inverted window balance 202 mostly in shear, and the engagement between the fastener 216 and the connection pocket and the engagement between the protrusion 252 and the U-shaped channel 210 carries the majority of this load. The protrusion 252 generally has a high shear strength and a large surface area upon which the longitudinal load 274 is transferred. As such, the protrusion 252 can increase the load capacity of the balance shoe 204 by 50% or more when compared to known designs (e.g., over that of the hook/connection pocket connection alone). In one example, a rectangular-shaped protrusion 252 may be used with a longer edge positioned substantially orthogonal to the load 274 so that a large surface area is formed to transfer load between.

Additionally, during operation, the balance shoe 204 may be pulled away from the U-shaped channel 210 when installed in a window assembly and creates a pullout load 276 that separates the front face of the balance shoe 204 from the U-shaped channel 210. This load 276 may be a rotationally induced load (as illustrated), a linear load, or a combination thereof. The engagement between the engagement projection 244 and the U-shaped channel 210 carries the majority of this load 276. However, in some examples, the protrusion 252 (e.g., via a resilient connection) may also carry the pullout load 276 and resist the front face of the balance shoe 204 pulling away from the U-shaped channel 210.

In the example, the protrusion 252 is sized and shaped so as to not interfere with the pivot bar as it is being dropped into the balance shoe 204. By positioning the protrusion 252 in the path of travel of the pivot bar, the longitudinal load generated by the window sash is more in line with protrusion 252 along the longitudinal axis 241 (e.g., both the rotating cam and the protrusion 252 are aligned). This facilitates a stronger and more secure connection. In comparison, at least some known balance shoes that couple to the base wall of the U-shaped channel opposite of the pivot bar channel create a load path that is not aligned, and thereby, generates an inherent undesirable pull out force (e.g., the rotating cam and the protrusion are offset from one another). Furthermore, some known balance system have the U-shaped channel facing outward from the window jamb to help receive the pivot bar during sash installation. However, this orientation of the U-shaped channel exposes the balance system components (e.g., spring and pulleys) to dirt and debris accumulation. In contrast, the U-shaped channel 210 as described herein is oriented so as to protect the balance system components from dirt and debris accumulation and the configuration of the balance shoe 204 enables this operation.

Figure 5:
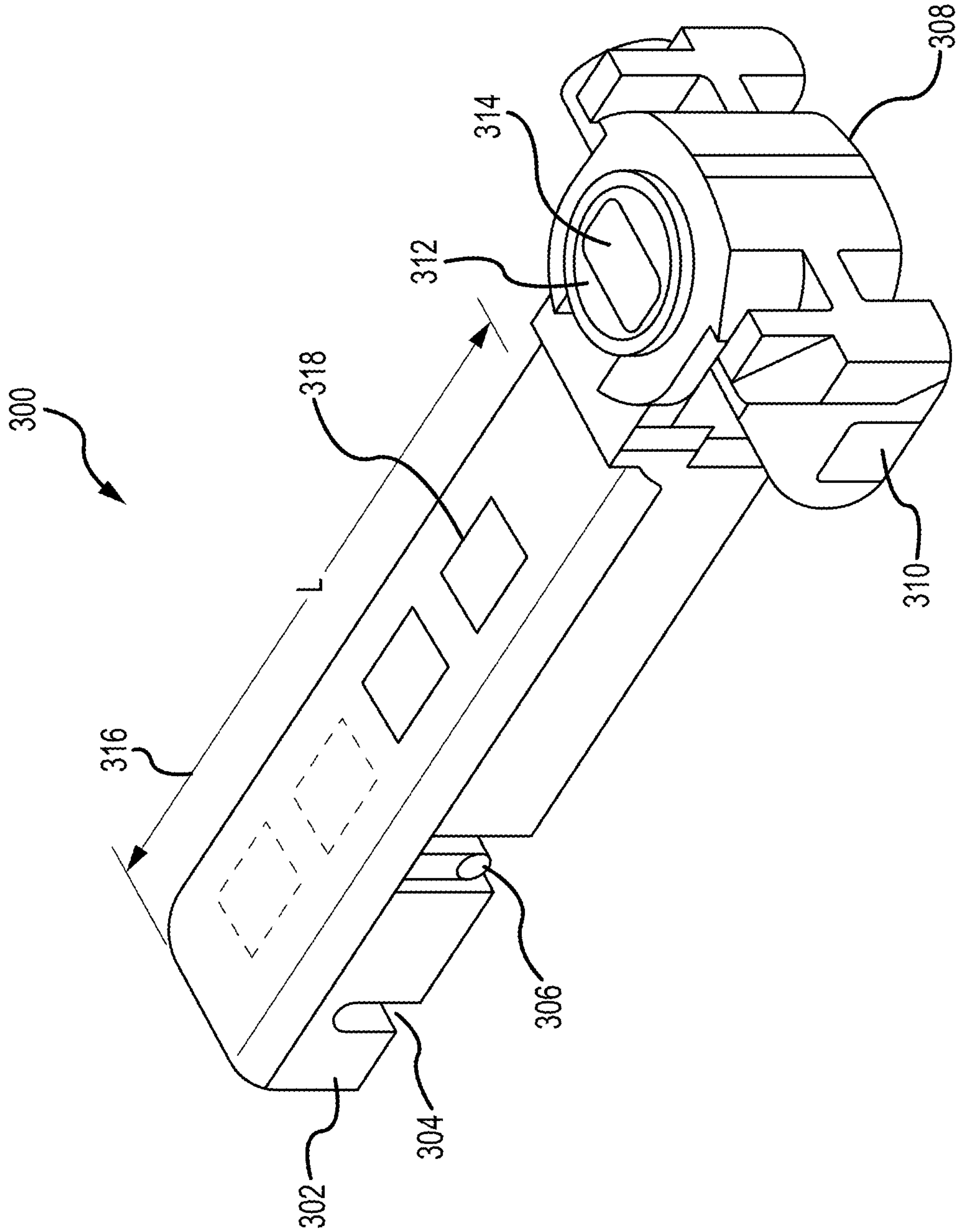
FIG. 5 is a perspective view of another window balance shoe.

FIG. 5 is a perspective view of another window balance shoe 300 that may be used with the inverted block and tackle window balance. The window balance shoe 300 has an elongate tail portion 302 that includes a connection pocket 304 and at least one connecting device 306. The window balance shoe 300 also includes an enlarged head portion 308 that includes a locking device 310 and a cam 312 (e.g., locking system) as described above. The cam 312 includes a keyhole opening 314 that is sized and shaped to receive the pivot bar (not shown) and facilitate the pivotable connection between the window sash and the balance shoe 300. However, in this example, the elongate tail portion 302 has a length L 316 that is greater than the previous example described above in FIGS. 2-4B. By lengthening the elongate tail portion 302, the balance shoe 300 can be coupled to the U-shaped channel so that the enlarged head portion 308 extends further outward from the end of the U-shaped channel. Accordingly, the balance shoe 300 allows a fixed-sized U-shaped channel to be used in a larger window having a greater travel distance by extending the length of the entire window balance system with the selected position of the balance shoe 300.

Additionally, for larger and heavier window assemblies, one or more protrusions 318 may extend from the elongate tail portion 302. Accordingly, the connection between the U-shaped channel and the balance shoe 300 can have additional load capacity and resistance to disengagement. For example, in transferring the longitudinal window load and/or the pullout load that increases with the length 316 of the balance shoe 300. In some examples, the one or more protrusions 318 may eliminate the need for either one or both of the connection pocket 304 and connecting devices 306. In another example, a screw (not shown) driven through the U-shaped channel and the elongate tail portion 302 may be used in conjunction with the protrusion 318 to secure the balance shoe 300 to the U-shaped channel. In yet other examples, the screw may replace the protrusions 318 entirely.

Figure 6:
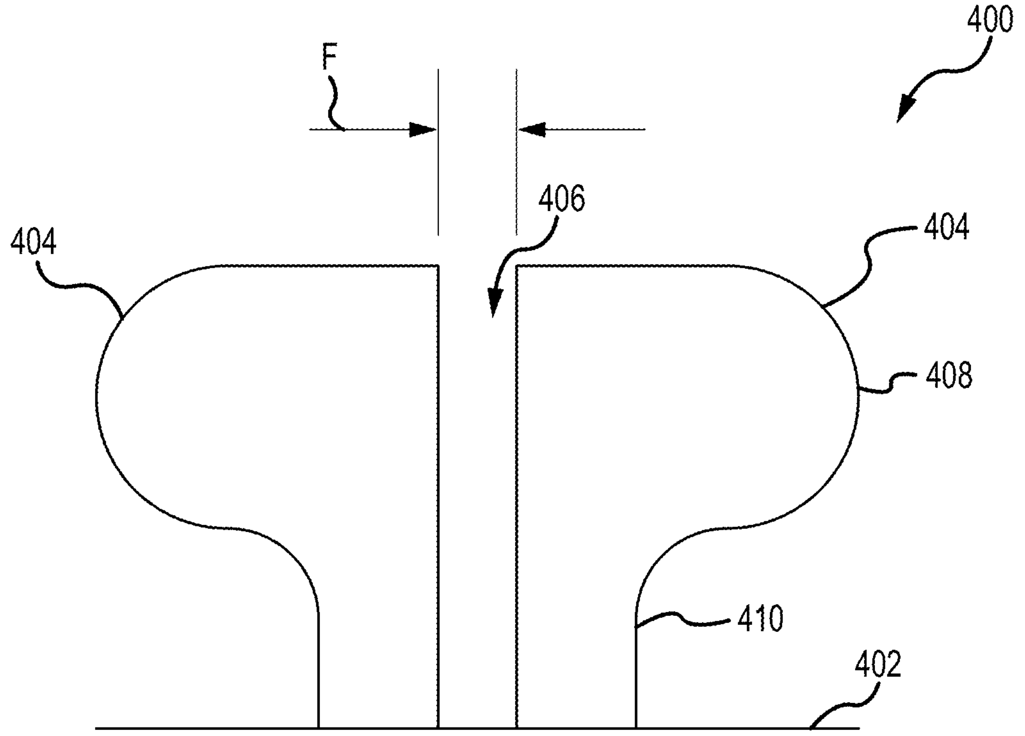
FIG. 6 is a side view of an exemplary protrusion.

FIG. 6 is a side view of an exemplary protrusion 400 that may be used with the window balance shoes described above. The protrusion 400 extends from a front surface 402 (e.g., a ramped surface) of a balance shoe as described above. In this example, the protrusion 400 is formed with two symmetrical halves 404 at least partially separated by a gap 406. Each half 404 has an enlarged bulb 408 and a flexible post 410. The bulbs 408 are larger in size than that of the opening in the U-shaped channel. As such, when the protrusion 400 is received in the U-shaped channel, each half 404 of the protrusion 400 flexes F toward the gap 406 and resiliently-fits within the opening. Once the bulbs 408 pass through the U-shaped channel opening, they can return to their original position and the U-shaped channel is secured about the posts 410. This enables for the protrusion 400 to carry shear loads as well as pull out forces. In other examples, any other type of connection type may be used that enables the balance shoe to function as described herein. With use of the resilient connection, however, positive feedback is provided to the installer so that correct installation within the U-shaped channel is ensured. Additionally, the resilient connection resists pullout forces so that the front face of the balance shoe does not pull away from the U-shaped channel.

Figure 7:
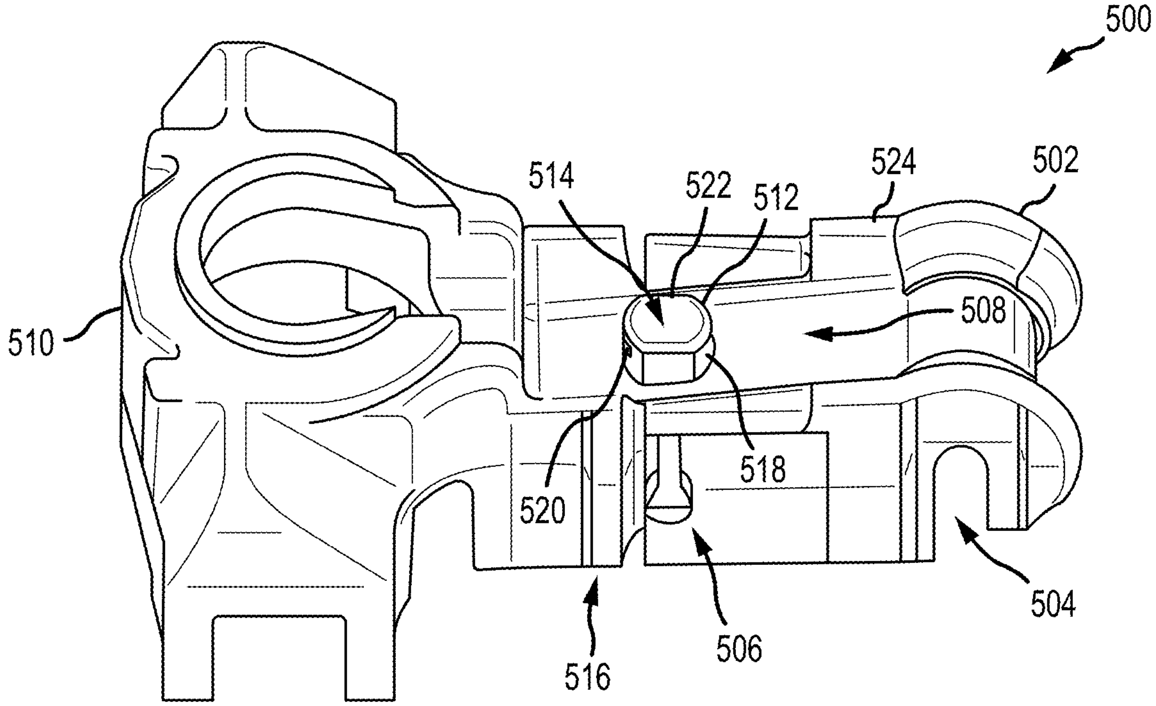
FIG. 7 is a perspective view of another window balance shoe.

FIG. 7 is a perspective view of another window balance shoe 500. Similar to the examples described above the window balance shoe 500 has an elongate tail portion 502 that includes a connection pocket 504, at least one connecting device 506, and an elongate channel 508. The window balance shoe 500 also includes an enlarged head portion 510 that houses a locking system (not shown). In this example, however, a protrusion 512 is disposed at least partially within the elongate channel 508 and has a face surface 514 that is substantially square to a tool parting line since the balance shoe 500 is typically a molded component. As such, the face surface 514 is substantially flat and parallel to a back face 516 of the balance shoe 500. By squaring the face surface 514 of the protrusion 512 with the tool parting line, flash (e.g., excess material that forms between the core and the cavity halves of the molded part) is reduced or eliminated. As such, the efficiency of the manufacturing process is increased and secondary processes to remove the flash (e.g., by hand trimming, vibratory tumbling, blasting, deflashing, etc.) are reduced or eliminated.

Additionally, in this example, the protrusion 512 includes a top wall 518, a bottom wall 520, and two sidewalls 522. The top wall 518 and/or the bottom wall 520 of the protrusion 512 may be curved, while the two sidewalls 522 are substantially parallel to one another. The two sidewalls 522 may also be substantially parallel to sidewalls 524 of the elongate tail portion 502. In some examples, the sidewalls 522 of the protrusion 512 may be angled relative to one another (e.g., if the protrusion 512 is trapezoidal or triangle in shape). The height of the top wall 518 may correspond to the thickness of the U-shaped channel that the balance shoe 500 couples to so that the protrusion 512 does not interfere with the pivot bar as it is dropped into the locking system. In other examples, the protrusion 512 may extend outward from the U-shaped channel when coupled thereto as required or desired.

Figure 8:
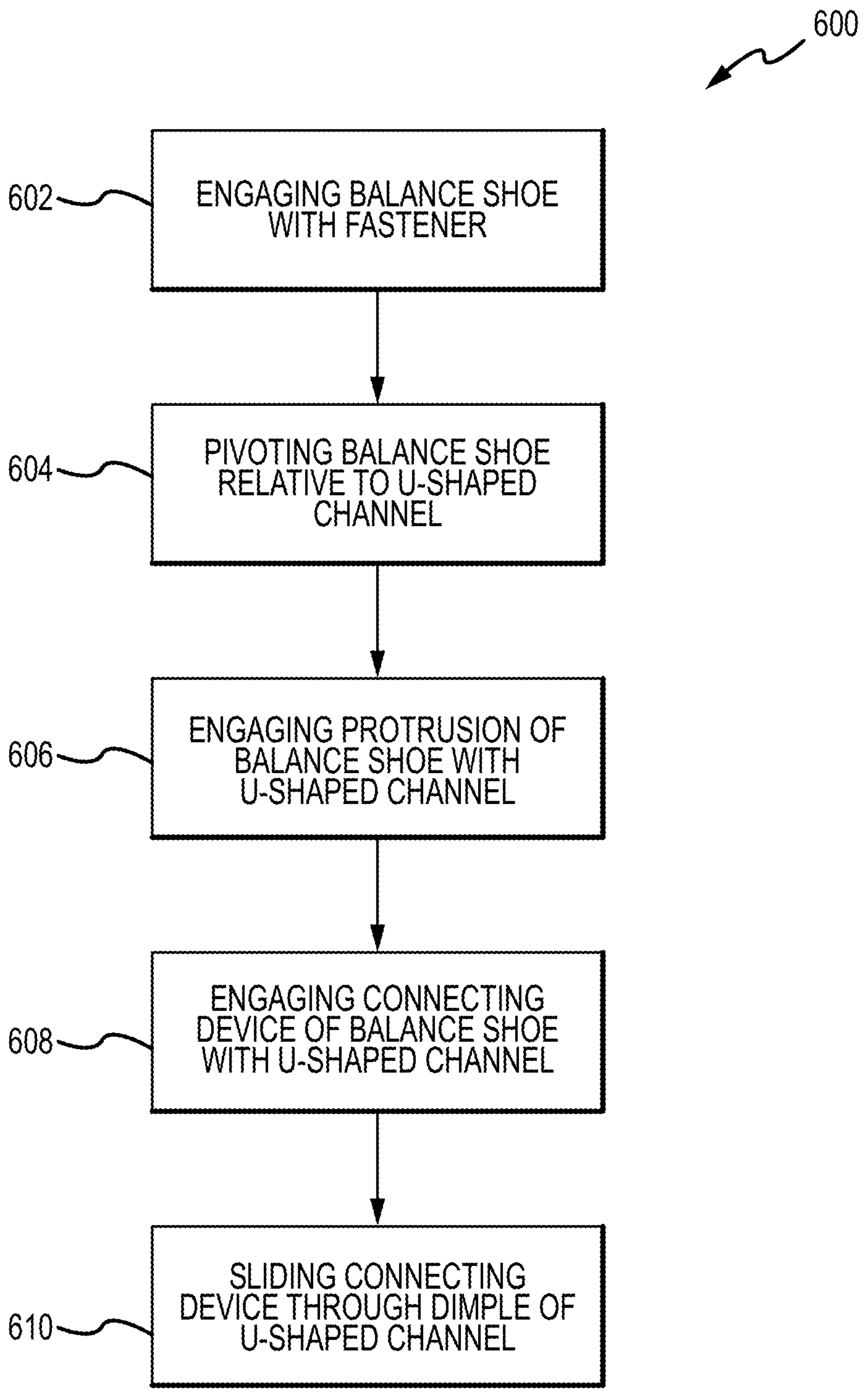
FIG. 8 is a flowchart illustrating a method of assembling a block and tackle window balance system.

FIG. 8 is a flowchart illustrating a method 600 of assembling a block and tackle window balance system. The method 600 includes engaging a balance shoe with a fastener that extends across a U-shaped channel in a first orientation (operation 602). The U-shaped channel includes a base wall and two opposing sidewalls, and the fastener extends across the two sidewalls. For example, the first orientation may include orienting the balance shoe at an angle relative to the U-shaped channel such that an elongated tail portion is partially inserted into the U-shaped channel and an enlarged head portion is not aligned with the U-shaped channel. The balance shoe is then pivoted into a different second orientation relative to the U-shaped channel (operation 604). In the second orientation, the elongated tail portion is dispose within the U-shaped channel and the enlarged head portion of the balance shoe extends from the U-shaped channel but is aligned with a longitudinal axis of the window balance system. Substantially simultaneously with pivoting the balance shoe, at least one protrusion of the balance shoe is engaged with at least one corresponding opening that is defined in the base wall of the U-shaped channel (operation 606). The protrusion extends from a front face of the balance shoe and at least partially within an elongate channel of the balance shoe. The elongate channel is positioned adjacent to the base wall of the U-shaped channel in the second orientation and is configured to allow passage of a pivot bar.

In some examples, the method 600 may further include engaging at least one connecting device of the balance shoe with a sidewall of the U-shaped channel (operation 608). The connecting device may engage with the U-shaped channel substantially simultaneously with the pivoting of the balance shoe (operation 604). Additionally, when the connecting device engages with the U-shaped channel, at least a portion of the connecting device may slide through a dimple formed in the sidewall of the U-shaped channel (operation 610).

The materials utilized in the balance systems described herein may be those typically utilized for window and window component manufacture. Material selection for most of the components may be based on the proposed use of the window. Appropriate materials may be selected for the sash balance systems used on particularly heavy window panels, as well as on windows subject to certain environmental conditions (e.g., moisture, corrosive atmospheres, etc.). Aluminum, steel, stainless steel, zinc, or composite materials can be utilized (e.g., for the shoe locking systems). Bendable and/or moldable plastics may be particularly useful.

Any number of the features of the different examples described herein may be combined into one single example and alternate examples having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

While there have been described herein what are to be considered exemplary and preferred examples of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A balance shoe for a block and tackle window balance system, the balance shoe comprising:

an enlarged head portion housing a locking system comprising a rotatable cam having a keyhole opening configured to receive at least a portion of a pivot bar and a locking device configured to releasably engage a jamb track;

an elongate tail portion defining a longitudinal axis and comprising a front face and an opposite back face both extending between two opposing sidewalls, the back face defining a connection pocket configured to engage a fastener of a U-shaped channel of the window balance system, and wherein the front face of the elongate tail portion is adjacent to a base wall of the U-shaped channel when the elongate tail portion is coupled therein;

at least one protrusion extending from the front face of the elongate tail portion and configured to engage with the base wall of the U-shaped channel; and a connecting device disposed on each sidewall of the two opposing sidewalls and configured to be resiliently secured to a corresponding sidewall of the U-shaped channel, the connecting device comprising a flexible arm extending from the sidewall of the elongate tail portion at a line of flexure along the longitudinal axis and an engagement projection located at a free end of the flexible arm, wherein the line of flexure is disposed between the connection pocket and the at least one protrusion along the longitudinal axis of the elongate tail portion.

2. The balance shoe of claim 1, wherein the engagement projection and the at least one protrusion are aligned relative to the longitudinal axis of the elongate tail portion.

3. The balance shoe of claim 1, wherein the front face defines an elongate channel recessed relative to the two opposing sidewalls, the at least one protrusion disposed within the elongate channel.

4. The balance shoe of claim 3, wherein a top end of the elongate tail portion defines a hook around the connection pocket, the elongate channel extending at least partially around the hook.

5. The balance shoe of claim 1, wherein the at least one protrusion comprises two or more protrusions spaced along the longitudinal axis.

6. The balance shoe of claim 1, wherein the at least one protrusion comprises two symmetrical, flexible halves separated by a gap.

7. The balance shoe of claim 1, wherein the at least one protrusion comprises a top wall, a bottom wall, and two sidewalls, the top wall and the bottom wall are curved and the two sidewalls are parallel to each other.

8. The balance shoe of claim 1, wherein the at least one protrusion comprises a face surface parallel to the back face of the elongate tail portion.

9. The balance shoe of claim 1, wherein the at least one protrusion and the connecting device are configured to be releasable disengaged from the U-shaped channel such that the balance shoe is selectively removable from the U-shaped channel.

10. The balance shoe of claim 1, wherein the flexible arm of the connecting device has a length between the free end and the line of flexure, the length greater than a longitudinal length of the at least one protrusion defined between a top wall and a bottom wall.

11. A block and tackle window balance system comprising:

a U-shaped channel comprising a base wall and two opposing sidewalls housing at least partially a block and tackle balance assembly, wherein the U-shaped channel comprises a first end having a fastener extending between the two opposing sidewalls, an aperture defined on each of the two opposing sidewalls, and at least one opening defined within the base wall, and wherein the aperture and the at least one opening are disposed between the first end and the fastener; and a balance shoe coupled to the first end of the U-shaped channel, wherein the balance shoe comprises:

an enlarged head portion extending from the first end of the U-shaped channel;

a locking system housed within the enlarged head portion and comprising a rotatable cam having a keyhole opening configured to receive at least a portion of a pivot bar and a locking device configured to releasable engage a jamb track;

an elongate tail portion defining a longitudinal axis and comprising a front face and an opposite back face both extending between two opposing sidewalls, the back face defining a connection pocket engaged with the fastener of the U-shaped channel;

at least one protrusion extending from the front face of the elongate tail portion and engaged with the at least one opening of the base wall of the U-shaped channel such that the front face of the elongate tail portion is adjacent to the base wall; and a connecting device disposed on each sidewall of the two opposing sidewalls of the elongate tail portion, the connecting device comprising a flexible arm extending from the sidewall of the elongate tail portion at a line of flexure along the longitudinal axis and an engagement projection located at a free end of the flexible arm engaged with the aperture of the sidewall of the U-shaped channel, wherein the line of flexure is disposed between the connection pocket and the at least one protrusion along the longitudinal axis of the elongate tail portion.

12. The block and tackle window balance system of claim 11, wherein the at least one opening and the apertures are axially aligned at the first end of the U-shaped channel.

13. The block and tackle window balance system of claim 11, wherein the base wall of the U-shaped channel comprises a ramped portion at the first end of the U-shaped channel, the at least one opening disposed within the ramped portion.

14. The block and tackle window balance system of claim 13, wherein the at least one protrusion comprises a face surface parallel to the ramped portion of the U-shaped channel.

15. The block and tackle window balance system of claim 11, wherein a dimple is formed on each sidewall of the U-shaped channel proximate the aperture.

16. The block and tackle window balance system of claim 11, wherein the at least one opening comprises two or more openings spaced along the longitudinal axis, and the at least one protrusion comprises two or more corresponding protrusions.

17. The block and tackle window balance system of claim 11, wherein the at least protrusion is spaced apart from the connection pocket on the elongate tail portion such that space therebetween is configured to receive a screw driven through the U-shaped channel into the elongate tail portion.

18. The block and tackle window balance system of claim 11, wherein the at least one protrusion of the balance shoe is configured to at least partially flex and snap-fit engage with the at least one opening of the U-shaped channel.

19. The block and tackle window balance system of claim 11, the at least one protrusion comprises a top wall, a bottom wall, and two sidewalls, the top wall having a height that equals a thickness of the base wall of the U-shaped channel.

20. The block and tackle window balance system of claim 11, wherein the flexible arm of the connecting device has a length between the free end and the line of flexure, the length greater than a longitudinal length of the at least one protrusion defined between a top wall and a bottom wall.

* * * * *